R. A. HARVEY.
COMB CLEANER.
APPLICATION FILED AUG. 15, 1911.

1,038,362.

Patented Sept. 10, 1912.

2 SHEETS—SHEET 1.

Witnesses
Howard P. King
Harry M. Test

Inventor
Roy A. Harvey
Harry Ellis Chandler
Attorney

R. A. HARVEY.
COMB CLEANER.
APPLICATION FILED AUG. 15, 1911.
1,038,362. Patented Sept. 10, 1912.
2 SHEETS—SHEET 2.
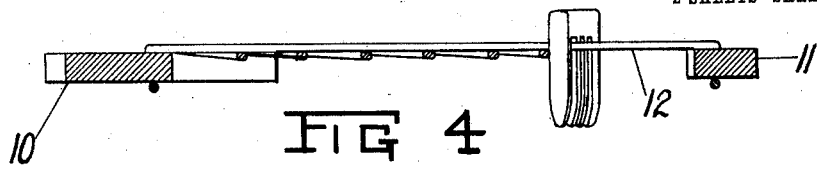
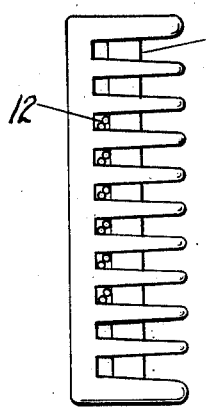
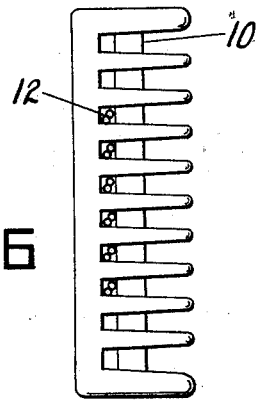
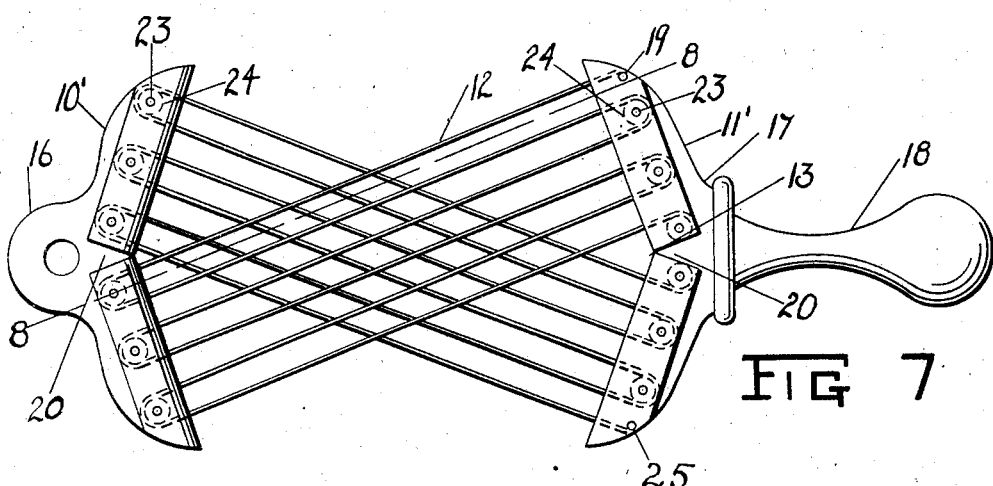
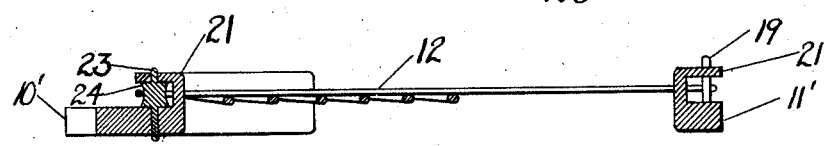
Witnesses
Howard P. King
Harry M. Test
Inventor
Roy A. Harvey
Harry Ellis Chandlee
Attorney

UNITED STATES PATENT OFFICE.

ROY A. HARVEY, OF MULLAN, IDAHO.

COMB-CLEANER.

1,038,362.  Specification of Letters Patent.   Patented Sept. 10, 1912.

Application filed August 15, 1911.  Serial No. 644,127.

*To all whom it may concern:*

Be it known that I, Roy A. Harvey, a citizen of the United States, residing at Mullan, in the county of Shoshone and State of Idaho, have invented certain new and useful Improvements in Comb-Cleaners, of which the following is a specification.

This invention relates to improvements in comb cleaners and has particular reference to toilet comb cleaners.

The principal object of the invention consists in the peculiar arrangement of the cleaning wires or cords whereby the maximum cleaning efficiency is obtained.

Another object is to provide a device of this character whereby the cleaning wires or cords will all be held at an even uniform tension.

These and other objects will be apparent from the following description and with particular reference to the accompanying drawings.

Figure 1:
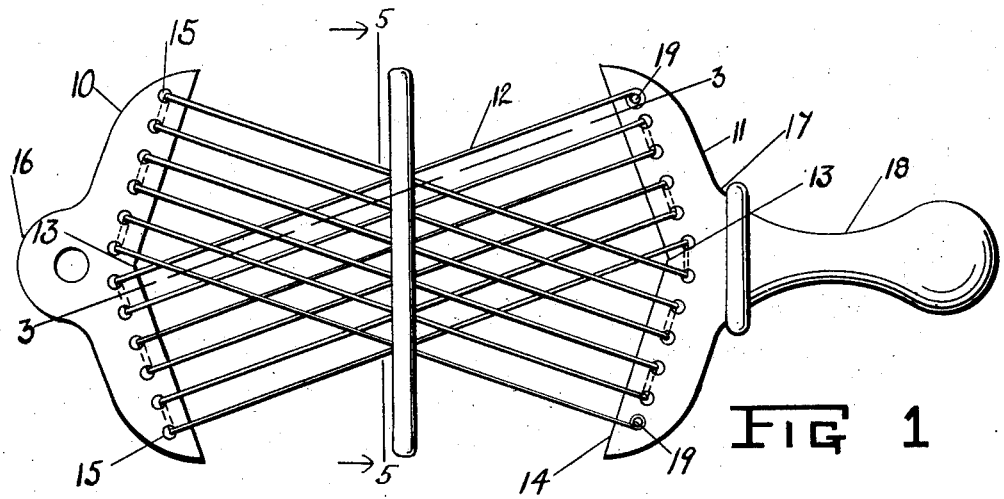
Figure 2:
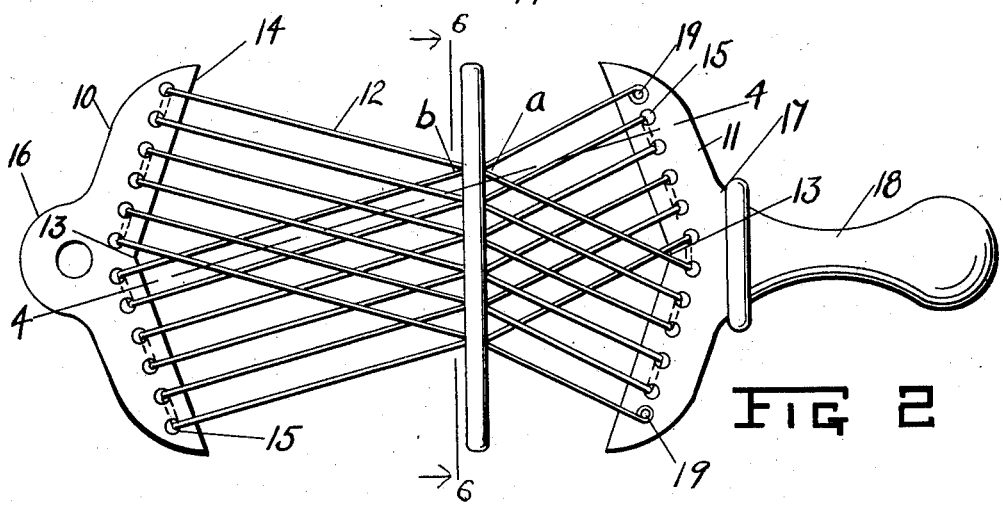
Figure 3:
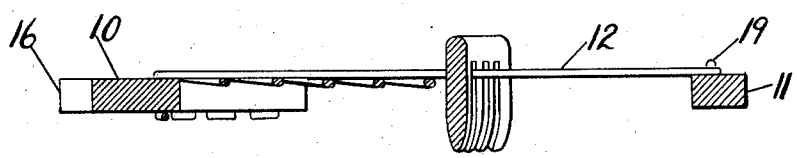

In the drawings: Figure 1 is a plan view of my comb cleaner, the comb being shown in position before manipulating the same. Fig. 2 is a similar view showing the comb drawn to a point adjacent one end of the cleaner. Fig. 3 is a longitudinal section on the line 3—3 of Fig. 1. Fig. 4 is a similar section on the line 4—4 of Fig. 2. Fig. 5 is a section on the line 5—5 of Fig. 1. Fig. 6 is a section on the line 6—6 of Fig. 2. Fig. 7 is a plan view of the modified form of cleaner, and Fig. 8 is a section on the line 8—8 of Fig. 7.

Referring to the drawings, it will be seen that the device comprises the two plates 10 and 11, between which pass the cords or wires 12. Each of the plates 10 and 11 has one edge formed with an obtuse angle 13 to provide the inclined portions 14, each of which is formed with a series of openings 15. Formed integrally with the upper central portion of the plate 10 is a perforated ear 16 for engagement with a nail or similar device to support the cleaner. The other plate 11 has an extension 17 secured within a wooden handle which is adapted to be grasped in the hand in the use of the device.

Secured in any suitable manner as by the pin 19 is one end of the cord portions 12, said cord portions forming part of a single cord which is passed from one inclined portion to the diagonally opposite similar portion on other plate, and then back and forth through the openings in the other diagonally disposed inclined portions, thus causing the cord portions 12 to cross as shown. As represented in the first form the cords are passed back and forth through the openings, but it will be understood that separate lengths of cord might be used and secured at their opposite ends to the diagonally disposed inclined portions.

In the use of the device the ear 16 is engaged with a nail or other device, and the handle 18 grasped in one hand, and the comb to be cleaned placed transversely of the cords as represented in the Fig. 1 and pushed down until the cords engage between the teeth. The handle is held outwardly to bring the cords under tension, and then the comb is drawn toward the user as shown in Fig. 2, and then moved along toward the plate 10. In this way the cords pass between a pair of teeth, at the angle indicated at *a* and *b* thus cleaning a greater surface than would be possible with the use of a single straight cord. With a single cord, the cord, to properly clean the space between the teeth, would be rather large, and would be liable to break the teeth when the same would be forced therebetween. On the other hand a single cord small enough to be readily inserted between the teeth, would be too small, and would require a peculiar manipulation of the comb longitudinally thereof, to clean both side faces of the teeth.

With the present arrangement of the cords, as illustrated, the same effect of manipulating the comb as above referred to is accomplished by a simple movement of the comb back and forth between the plates 10 and 11.

Referring to Figs. 7 and 8, each of the plates 10′ and 11′ are cut as at 20, and the portions on each side of the cuts are doubled over in parallel relation to each of the plates as represented by 21. Extending through the body portion of each of the plates, and through the turned up portions 21 are the pintles 23 of the rollers 24 which are arranged on the same lines as the openings 15 in the other form. In this form one end of a cord is attached at 19, passed in the same direction as in the other form, but around the rollers 24, and its opposite end secured at 25. With this construction the cord portions are easily held so that they will all be of approximately the same tension, the portions adjusting themselves by means of the rollers 24. The cords in the forms shown in Figs. 7 and 8 are crossed in the same manner as in the other form, and the operation of the device is identical therewith.

From the foregoing it will readily be seen that with the peculiar construction of the device as shown and described, that the cords will thoroughly clean the space between the teeth of both coarse toothed combs and fine toothed combs, the cords adjusting themselves so as to clean the space no matter what the width. It will also be observed that the space between the points of the teeth is wider than between the bases of the teeth so that the cords will readily adjust themselves to the difference in the widths therebetween, thus thoroughly cleaning the entire surface of each tooth and the base of each cut therebetween.

What is claimed is:

1. A comb cleaner comprising a pair of plates, each having forward edges inclining from opposite sides of the center thereof, said inclined portions being arranged in diagonally opposite parallel pairs, and formed with openings, and a cord attached to one of said plates and passed diagonally in parallel relation through the openings of one pair of inclined portions, and through the openings in the other pair in parallel relation.

2. A comb cleaner comprising a pair of plates, oppositely inclined portions on the plates, the inclined portions of one plate being arranged respectively in parallel relation to the diagonally opposite inclined portions of the other plate, a hand grip on one of said plates, a cord passed back and forth between one pair of the diagonally opposite inclined portions, and then back and forth between the other pair of diagonally arranged inclined portions so that the portions of said cord will cross each other between the plates, and anti-friction means on said plates for engagement by said cord.

In testimony whereof I affix my signature, in the presence of two witnesses.

ROY A. HARVEY.

Witnesses:
 ETHEL M. GOODSELL,
 C. W. GOODSELL.

Copies of this patent may be obtained for five cents each, by addressing the "Commissioner of Patents, Washington, D. C."